April 14, 1953 K. H. ANDREN Re. 23,641
PORTABLE SHEET COUNTER AND MARKER
Original Filed July 25, 1949 2 SHEETS—SHEET 1
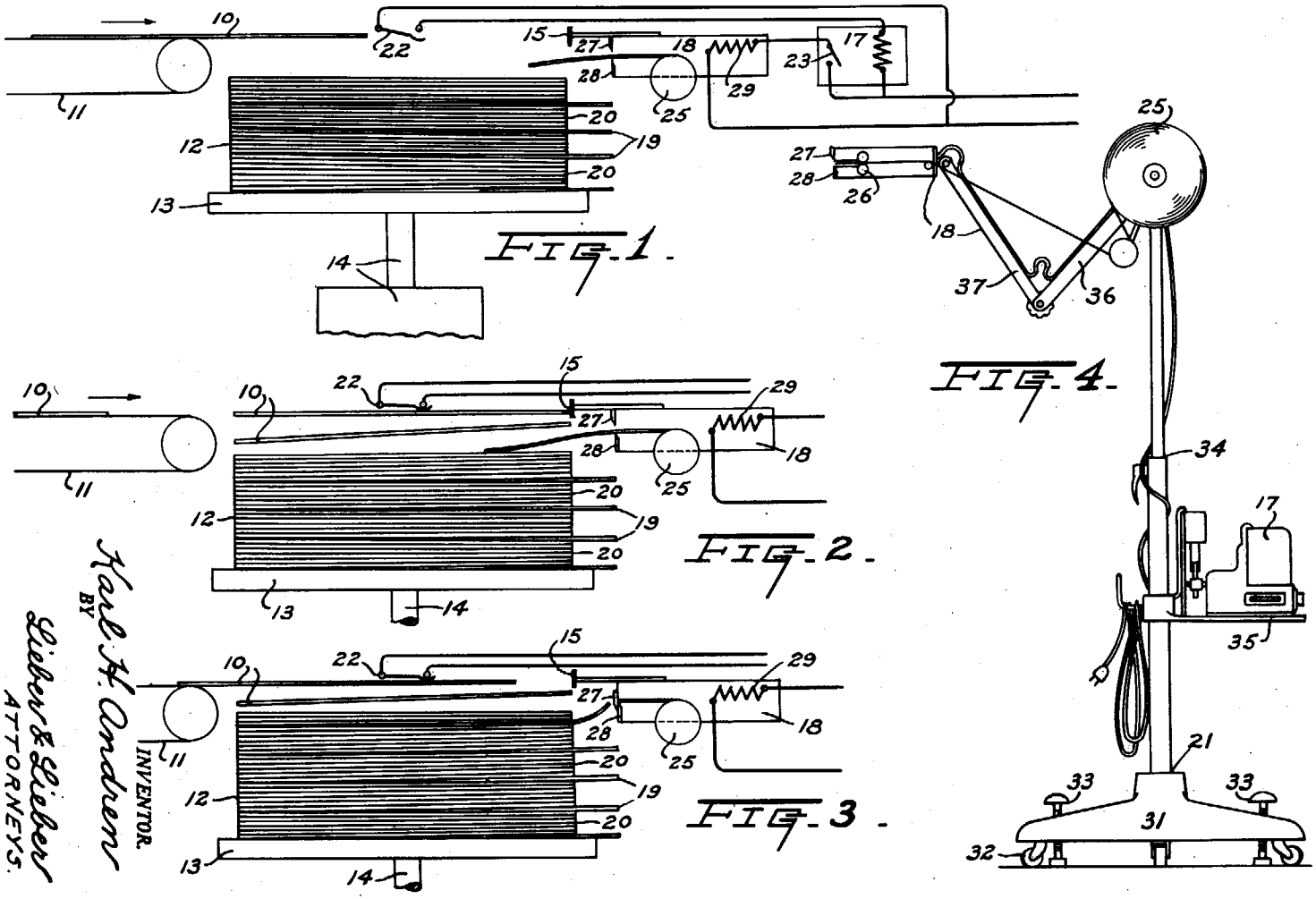
INVENTOR.
Karl H. Andren
BY
Lieber & Lieber
ATTORNEYS.

April 14, 1953 K. H. ANDREN Re. 23,641

PORTABLE SHEET COUNTER AND MARKER

Original Filed July 25, 1949 2 SHEETS--SHEET 2

INVENTOR.
Karl H. Andren
BY
Lieber & Lieber
ATTORNEYS.

Reissued Apr. 14, 1953

Re. 23,641

UNITED STATES PATENT OFFICE 23,641

PORTABLE SHEET COUNTER AND MARKER

Karl H. Andren, Greenfield, Wis., assignor to Counter and Control Corporation, Milwaukee, Wis., a corporation of Wisconsin Original No. 2,619,883, dated December 2, 1952, Serial No. 106,519, July 25, 1949. Application for reissue December 30, 1952, Serial No. 328,834

3 Claims. (Cl. 93—93)

Matter enclosed in heavy brackets [ ] appears in the original patent but forms no part of this reissue specification; matter printed in italics indicates the additions made by reissue.

My present invention relates generally to improvements in the art of segregating successive articles into measured groups, and relates more specifically to an improved portable assemblage for automatically counting and marking counted batches of sheets while being delivered to a stack.

The primary object of the present invention is to provide an improved portable sheet counting and marking unit which is simple in construction and highly efficient in use.

In the paper and other industries, it is customary to cut the stocks into sheets of predetermined size, and to arrange the successive finished sheets in stacks for subsequent disbursement in batches or lots. In order to permit such ultimate dispensation of the stacks in batches each containing a definite number of individual sheets, it is desirable to segregate successive equal lots by means of markers or insert slips. While it has heretofore been common practice to thus apply insert slips to stacks of sheets, the prior stack markers were custom built for cooperation only with certain types of printing presses or similar machines, and they were therefore not only costly to install but their use was limited to the particular service or machine for which they were initially built.

It is, therefore, an important object of my invention to provide a simple but highly reliable portable device for rapidly applying such markers or insert slips in an exceedingly accurate manner so that each group will contain the same number of sheets as all others, and wherein all of the mechanism is embodied in a single self contained unit.

Another object of the present invention is to provide an improved portable marker insert unit which may be quickly and conveniently associated with various types of sheet stacking mechanisms to apply the marker strips at any of the four sides of the stacks.

A further object of this invention is to provide an extremely reliable and accurately functioning portable sheet counting and batch marker applying assemblage, which is also flexible in its adaptation to different kinds of sheet handling equipment.

Still another object of my present invention is to provide an improved marking unit for subdividing stacks of sheet-like articles into equal lots continuously, accurately and with minimum attention, and wherein the number of articles in each lot may be varied at will.

These and other objects and advantages of the invention will be apparent from the following detailed description.

A clear conception of the features constituting my present improvement, and of the construction and operation of several typical portable sheet counters and markers embodying the invention, may be had by referring to the drawings accompanying and forming a part of this specification wherein like reference characters designate the same or similar parts in the various views.

Fig. 1 is a diagram depicting the equipment and wiring for electrical apparatus which may be utilized in connection with my portable sheet counting and marking unit, showing a new sheet about to operate the counter actuating switch and a fresh insert slip being fed upon the top sheet of the previously formed stack;

Fig. 2 is a similar diagram showing the fresh insert slip fed into final position but still attached to its source of supply, and also showing several new sheets delivered over the top of the stack and in the act of dropping thereon;

Fig. 3 is another similar diagram showing the freshly applied insert strip held in proper position by several new sheets deposited thereon and immediately after the fresh slip has been severed from its supply source, and also showing other new sheets being delivered upon the stack;

Fig. 4 is a side view of a commercial portable sheet counting and marker applying unit, wherein both the elevation and the lateral position of the marker delivery means may be varied without moving the supporting stand;

Figure 5:
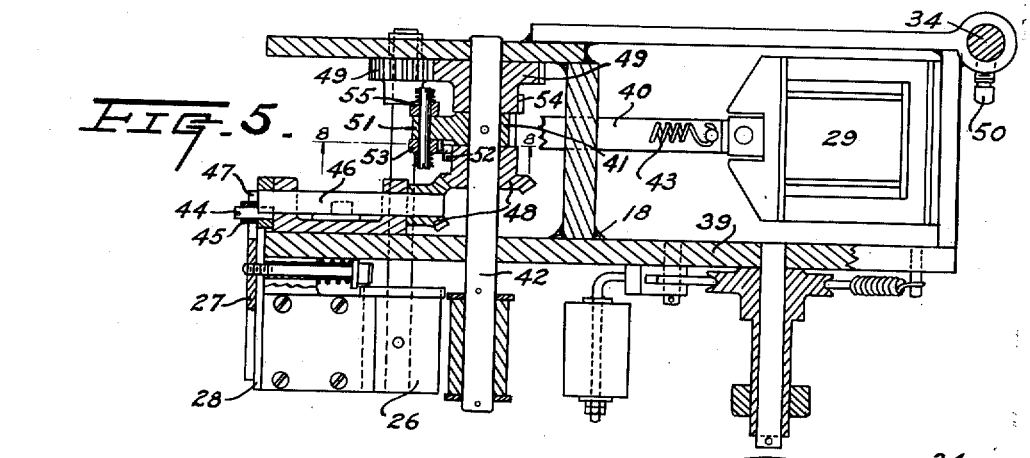
Fig. 5 is an enlarged part sectional top view of a modified commercial insert marker feeding and cutting mechanism, the section having been taken along the line 5—5 of Fig. 6.

While the invention has been shown by way of illustration as having been incorporated in only two specific types of portable units for counting and marking paper sheets, it is not intended to unnecessarily restrict the utility thereof by virtue of this limited embodiment, and it is also contemplated that specific descriptive terms employed herein be given the broadest interpretation consistent with the disclosure.

By referring to the diagrams of Figs. 1, 2 and 3 [and], it will be noted that my improved portable unit for counting and segregating successive batches of stacked articles, is advantageously applicable to relatively standard article supply and stacking equipment for neatly, rapidly and continuously depositing successive flat articles or sheets 10 by means of a sheet feeder 11 in the form of a stack 12 upon a table [12] *13* mounted upon automatic lowering mechanism 14 which constantly maintains the top sheet 10 of the stack 12 at a predetermined level or elevation. The feeder 11 may be operable to deliver the successive sheets 10 against a fixed abutment or stop 15 in vertical alinement with the stack 12 but some distance above the top level of the latter as fixed by the supporting and lowering mechanism 14, so that a short time interval elapses while each successive new sheet 10 drops into finally stacked position. All of this feeding and stacking equipment is well known and constitutes no part of my invention, and my improved portable unit may be associated with any of the four sides of the stack 12.

In accordance with the present invention, I provide a portable unit having mounted thereon mechanism for effecting automatic repetition of a predetermined number of events in the form of a compact device 17 and as shown in detail in my Patent No. 2,489,474, granted November 29, 1949, and also embodying a tape or ribbon supply and marker cutting and inserting mechanism 18, the device 17 and mechanism 18 cooperating to accurately count the successive sheets 10 deposited upon the stack 12 and to inject marking slips or tickets 19 between the successive superimposed equal lots or batches 20 of the stack 12. The mechanism or device 17 is operable by a heavy duty solenoid as shown in Fig. 4, and is disposed or mounted upon a portable stand assemblage 21 as illustrated in Fig. 4, being cooperable with a sensitive switch 22 operable by the incoming or new sheets 10 delivered to the stack 12 by the feeder 11, to accurately count the successive sheets; and this device 17 may also be preset so as to actuate another switch 23 after a predetermined number of counting events or counts has been effected. Both of these switches 22, 23 are also directly associated with the portable unit.

Figure 6:
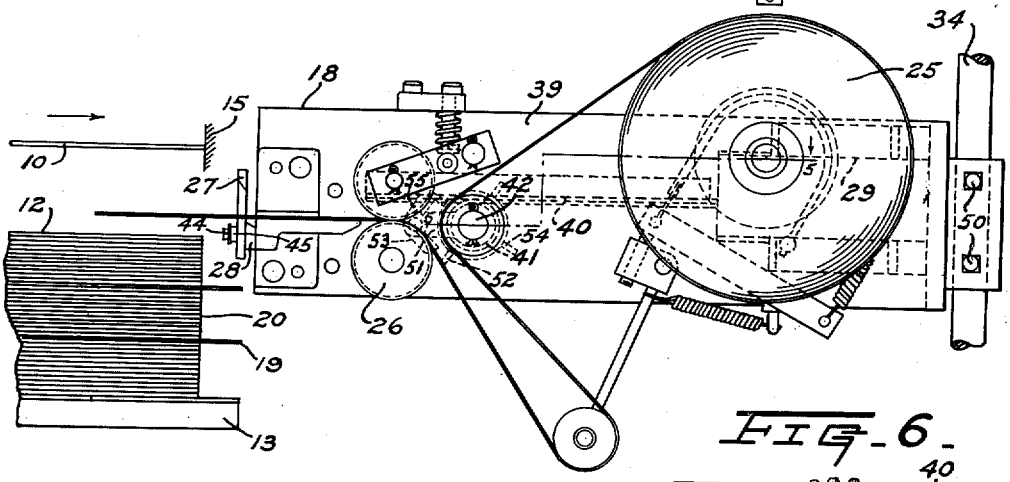
Fig. 6 is a similarly enlarged side elevation of the mechanism shown in Fig. 5 but showing an insert marker supply roll applied thereto and in the act of feeding a marking slip or ticket to a stack of sheets.
Figure 8:
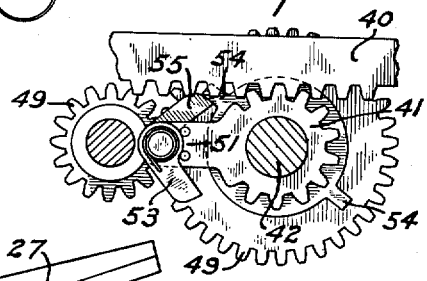
Fig. 8 is an enlarged section through the mechanism taken along the line 8—8 of Fig. 5.
Figure 7:
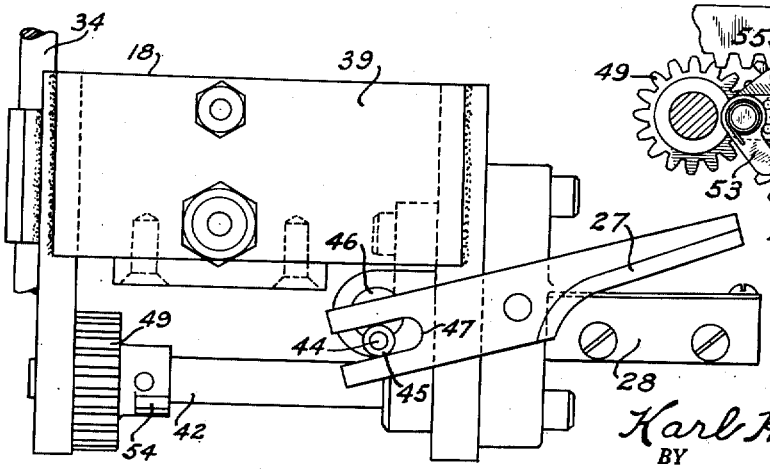
Fig. 7 is a further enlarged end view showing the insert slip severing knives of the mechanism of Figs. 5 and 6.

The marker ribbon supply, injecting and cutting mechanism 18 is likewise mounted upon the same portable stand assemblage 21, and may be constructed either as shown in Fig. 4, or as in Figs. 5 to 7 inclusive, but in either case the mechanism 18 embodies a tape supply roll 25, a pair of tape feed rolls 26, a pair of cutter knives 27, 28, and a solenoid 29 operable by the switch 23 to effect feeding of the marker stock and severing thereof into successive insert lengths or tickets 19 of equal length. In general, this assemblage is such that after the selected and predetermined count of sheets 10 in each batch or lot 20 has been reached, the switch 23 of the unit 17 will automatically close thus energizing the solenoid 29 and causing the supply roll 25 and cooperating feed rolls 26 to deliver a fixed length of tape or marking paper beneath the next incoming sheet 10 as in Figs. 1 and 2; and after several new sheets 10 have piled on top of the newly fed marker 19 so as to hold the latter as shown in Fig. 3, the switch 23 will open and the core of the solenoid 29 will be retracted to actuate the movable knife 27 and to thereby sever the fresh marker 19 from its supply source.

The portable stand assemblage illustrated in Fig. 4 comprises in general a base 31 mounted on rollers 32 and having retaining jack screws 33 for holding it in fixed position; and a telescopically adjustable column 34 *including a lower hollow fixed section* rising from the base 31 and providing a support for the mechanisms 17, 18. The counting and control device 17 is mounted upon a bracket 35 which is adjustable vertically along the lower fixed section of the column 34, and the marker ribbon supply roll 25 of the upper insert producing mechanism 18 is journalled upon the upper extremity of the upper vertically adjustable column section while the feeding and cutting portion of the mechanism 18 is carried by a pair of relatively adjustable suspension links 36, 37 so that the knives 27, 28 may be definitely positioned either vertically or horizontally relative to the stack forming mechanism. As previously indicated, the device 17 is of the type shown and described in detail in my above mentioned patent, and the sheet counting switch 22 which cooperates with this device 17 may be either a lever type or a photo-cell type, and the marker feed mechanism 18 may be constructed in detail as shown in Figs. 5 to 7 inclusive.

In the modified commercial embodiment of the insert producing mechanism 18 as shown in Figs. 5, 6, 7, and 8, the solenoid 29 and the marker ribbon supply roll 25 are both mounted upon a common frame 39 which also supports the movable and fixed knives 27, 28 and the feed rollers 26. The core of the solenoid 29 is attached to the reciprocable rack 40 which coacts with a pinion 41 secured to the knife and feed roll actuating shaft 42 and having an integral radial arm 51, and the solenoid core is movable in one direction when its coil is energized by closing of the switch 23 and is movable in the opposite direction by a spring 43 when this coil is de-energized. The movable knife blade 27 is oscillatable by an eccentric pin 44 and roller 45 carried by a shaft 46 and coacting with a slot 47 in this blade, and the shaft 46 is rotatable by the shaft 42 through bevel gears 48 one of which has lugs 52 thereon engageable by a pawl 53 pivoted to one side of the pinion arm 51. The feed rollers 26 are operable by spur gears 49 to feed a definite length of marker stock from the supply roll 25 whenever the solenoid 29 is energized, and one of the gears 49 also has lugs 54 thereon engageable by another pawl 55 pivoted to the opposite side of the pinion arm 51. The movable knife 27 becomes active to sever the marker 19 from the supply source only after a length of stock has been fed over the stack and several new articles or sheets 10 have been deposited thereon. The frame 39 of this modified portable unit may be vertically adjusted along the upright column 34 of the stand 21 with the aid of set-screws 50 in an obvious manner.

The improved portable unit may be readily positioned and quickly installed in conjunction with standard stack forming apparatus such as shown, and when the various parts have been adjusted for effective cooperation, the normal functioning of the improved system is substantially as follows. The sheet or other article feeder 11 is operating to continuously and rapidly deliver the successive articles 10 against the positioning stop 15 above the table 13, from whence they drop by gravity to form the stack 12. As each successive article 10 closes the switch 22, the device 17 accurately counts them, and when a predetermined number of counts has been completed, the device 17 immediately functions to close the switch 23 and thereby simultaneously energizes the solenoid 29. This actuation of the solenoid 29 promptly causes the feed rollers 26 to deliver a definite length of insert marker stock from the supply roll 25 past the separated knives 27, 28 and upon the top articles of the stack 12 before a new article 10 has fallen upon the stack, and after a few additional articles have been deposited upon the newly deposited marking insert, the solenoid 29 is de-energized and the spring 43 immediately becomes active to operate the knife 27 and to sever the new marker 19 from the source of supply. The lowering mechanism 14 functions to automatically and continually maintain the upper end of the stack 12 at the proper level or elevation, and the sheet counting and insert applying cycles are repeated in rapid succession as long as the supply of new sheets 10 continues.

It will thus be noted that I have in fact provided a simple and automatically functioning portable sheet counter and marker for accurately separating successive sheets into lots of predetermined magnitude, and for definitely marking the successive groups for convenient future dispensation. The sheet counting and control device 17 functions to count the sheets 10 in each batch 20 with utmost precision, and also operates the insert supply and severing mechanism 18 with such rapidity that the markers are injected between the top of the stack 12 and the next succeeding sheet 10 while the latter is still in suspension. The improved apparatus besides being simple and compact, is also highly flexible in its adaptation by virtue of its compactness and portability, and may be utilized to handle either plain or printed sheets 10 of paper or any other similar sheet materials. The present improved portable unit also may be installed without the use of tools and operated at moderate cost and with minimum attention, and has in fact proven highly satisfactory and successful in actual commercial use.

It should be understood that it is not desired to limit this invention to the exact details of construction and operation of the typical portable units herein specifically shown and described, for various modifications within the scope of the appended claims may occur to persons skilled in the art.

I claim:

1. In a portable sheet counting and marking unit, a stand having a base provided with an upright column comprising a lower fixed section and an upper vertically adjustable section, an electric solenoid actuated sheet counting device vertically adjustable along said fixed lower column section, a marker supply roll rotatably mounted near the upper end of said upper vertically adjustable column section, a pair of pivotally connected suspension links one of which has its end remote from the pivotal connection swingably associated with the upper portion of said upper adjustable column section, an electric solenoid actuated marker stock feeder and cutter swingably associated with the end of the other link remote from the pivotal connection, and means carried by said stand and being operable by said counting device to actuate said feeder and cutter.

2. In a portable sheet counting and marking unit, a stand having a base provided with an upright rigid column comprising a lower fixed section and an upper section telescopically vertically adjustable within said lower section, an electric solenoid actuated sheet counting device vertically adjustably mounted upon said lower column section, a marker supply roll rotatably mounted near the upper end of said upper column section, a pair of pivotally connected rigid suspension links one of which has its end remote from the pivotal connection pivotally secured to the upper portion of said upper column section near the axis of said supply roll, and an electric solenoid actuated marker stock feeder and cutter swingably connected to the end of the other link remote from said pivotal connection and being operable by said counting device.

*3. In a portable sheet counting and marking unit, a stand having a base provided with an upright rigid column comprising a lower hollow fixed section and an upper section telescopically vertically adjustable within said lower section, an electric solenoid actuated sheet counting device carried by the upper portion of said lower column section, a marker supply roll rotatably mounted near the upper end of one of said column sections, a rigid suspension link one end of which is pivotally associated with the upper portion of said upper adjustable column section, and an electric solenoid actuated marker stock cutter carrier by the swinging end of said link remote from its pivoted end and being operable by said counting device.*

KARL H. ANDREN.

References Cited in the file of this patent or the original patent

UNITED STATES PATENTS

| Number | Name | Date |
|---|---|---|
| 745,847 | Holton | Dec. 1, 1903 |
| 926,904 | Smithwick | July 6, 1909 |
| 1,782,660 | Meyer | Nov. 25, 1930 |
| 2,377,949 | McMenamy | June 12, 1945 |
| 2,382,998 | Kleinschmidt | Aug. 21, 1945 |
| 2,395,490 | Mathews | Feb. 26, 1946 |